United States Patent [19]

Anderson

[11] Patent Number: 4,497,892
[45] Date of Patent: Feb. 5, 1985

[54] METHOD FOR FORMING MULTIPLE IMAGES ON A PHOTOGRAPHIC FILM

[75] Inventor: Jeff L. Anderson, Cambridge, Ohio

[73] Assignee: NCR Corporation, Dayton, Ohio

[21] Appl. No.: 503,446

[22] Filed: Jun. 13, 1983

[51] Int. Cl.³ .............................................. G03B 21/14
[52] U.S. Cl. ...................................... 430/347; 430/13; 430/394; 430/396
[58] Field of Search ............... 430/13, 55, 347, 394, 430/396; 427/70; 350/358; 353/20

[56] References Cited
U.S. PATENT DOCUMENTS

| | | | |
|---|---|---|---|
| 3,498,705 | 3/1970 | Ooue et al. | 353/20 |
| 3,724,938 | 4/1973 | Nepela | 353/20 |
| 4,021,106 | 5/1977 | Gaynor | 430/55 |
| 4,025,165 | 5/1977 | Sollish et al. | 350/358 |
| 4,291,245 | 9/1981 | Nowlin | 427/70 |

Primary Examiner—John E. Kittle
Assistant Examiner—John L. Goodrow
Attorney, Agent, or Firm—J. T. Cavender; Wilbert Hawk, Jr.; Richard W. Lavin

[57] ABSTRACT

A method and apparatus for generating a negative or positive image from a single photographic medium. A source of radiant energy is projected onto a sheet of dielectric material heating the material to a polarizing temperature. A pair of electrical conductors are moved in a first direction along the surface of the heated dielectric material polarizing the material in the first direction. A photographic mask is then positioned over the polarized material and the radiant energy and the electrical field is again applied through the mask in a second direction to polarize certain portions of the material in the second direction. Projecting polarized light through the dielectric material and rotating the material during the projection produces a negative or positive image on the screen.

5 Claims, 7 Drawing Figures

DIRECTION OF POLARIZATION

METHOD FOR FORMING MULTIPLE IMAGES ON A PHOTOGRAPHIC FILM

CROSS-REFERENCE TO RELATED APPLICATIONS

A Method And Apparatus For The Production Of Electret Material, co-pending application Ser. No. 450,311, filed Dec. 16, 1982, by Jeff L. Anderson, assigned to NCR Corporation.

BACKGROUND OF THE INVENTION

The present invention relates to a method and apparatus for the reproduction of an image which involves the formation of an image on a recording member using electrical signals and more particularly relates to the formation of a recording element which can be utilized to project a positive or negative photographic image.

Materials known as "electret" are those prepared by maintaining a film, sheet or other shaped particle of a plastic composed of a polymeric or organic material such as carnauba wax or naphthalene; a polar resin such as polyfluorovinylidene resin, a polyvinyl chloride resin, polycarbonate, polyester, and acrylic resin, etc.; a non-polar resin such as polyethylene, polypropylene, polystyrene, etc. or copolymers of them; or a mixture of these materials at a suitable temperature for a period of time under the application of a D.C. potential and cooling the article to room temperature while maintaining the D.C. potential, resulting in the electrical polarization of the material in the direction of the applied D.C. potential.

Heretofore, such electrets have been composed of materials which afford excellent workability, toughness and flexibility for use in transformers such as speakers and microphones. It is known to use electrets in the production of electrostatic images in which a photoemissive layer is deposited on a charged electret after which an image is projected into the layer forming an electrostatic latent charged image after which it is developed to become visible. An example of this type of process may be found in U.S. Pat. No. 3,007,735. The disadvantage of this method of producing images is the expense involved, and further that it is limited to the production of either a photographic positive or a negative image, but not both within the same film. It is therefore a principal object of this invention to produce a photographic storage element which may project a positive or negative photographic image. It is a further object of this invention to provide a low-cost method of producing such a photographic element.

SUMMARY OF THE INVENTION

These and other objects of the invention are fulfilled by moving two electrical conductors positioned adjacent a sheet of a polymer-type dielectric material, which has been heated to a polarizing temperature by a lamp member producing images of sufficient energy and focused on the polymer material by a lens member. Movement of the electrical conductors applies a polarizing voltage to the material in which the molecules of the material are polarized in the direction of the movement of the conductors. A photographic mask or other means of creating an image is positioned over the polarized material and the material is selectively heated through this image to a temperature enabling the exposed portion of the material to be polarized in a direction perpendicular to the original polarization which remains on the unexposed material. Projecting the image on a screen using a light source beamed through a polarized member directs the polarized light in different polarized orientation planes enabling the polarized element to project a positive or negative photographic image.

BRIEF DESCRIPTION OF THE DRAWING

The foregoing and various other objects, advantages and meritorious features of the present invention will be apparent from the following detailed description and appended claims when read in conjunction with the drawings, wherein like numerals identify corresponding elements.

DESCRIPTION OF THE PREFERRED EMBODIMENT

Figure 1:
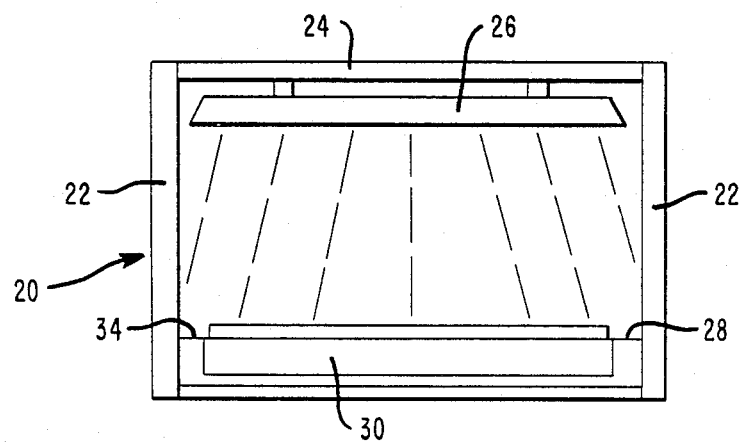
FIG. 1 is a schematic representation of the side view of the apparatus for polarizing a photographic film.

Referring now to FIG. 1, there is shown a schematic representation of the apparatus for polarizing a dielectric material to produce an electret. As disclosed in the above-referenced Anderson patent application Ser. No. 450,311, the apparatus comprises a movable carriage assembly generally indicated by the numeral 20 and which includes a pair of oppositely-positioned support members 22 between which is mounted a source of radiant energy such as a Quartz infrared lamp 24, a focusing lens 26 and a pair of electrical conductors 28 mounted in a side-by-side relationship to support members 22 and connected to a suitable power supply (not shown). The electrical conductors are located adjacent an electret-forming sheet or film 30 which may consist of a polyethylene material. The assembly 20 is driven along the edge of the material 30 with the lamp 24 providing a line source of radiant energy which is focused by the lens 26 to a position between the conductors 28 for heating the material 30 as the carriage assembly 20 moves past the surface of the polyethylene sheet.

Figure 2:
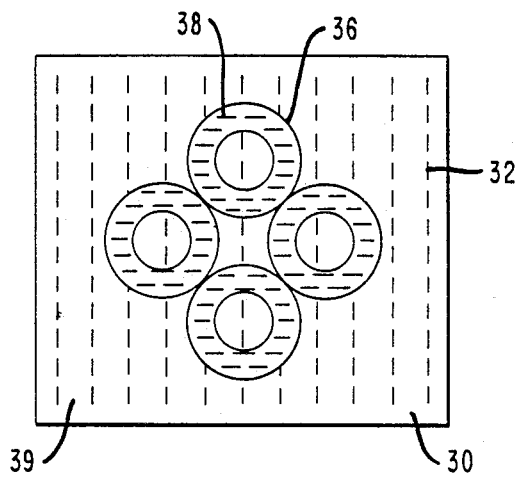
FIG. 2 is a plan view of the photographic film showing the orientation of the polarized material of the image and the film.

As fully disclosed in such referenced Anderson patent application, applying an electrical field to the sheet of material 30 at the time the temperature of the material has been raised to a polarizing temperature allows the sheet to be polarized in a direction indicated by the lines 32 of FIG. 2. As the carriage assembly moves past the point at which the radiant energy is applied, the temperature of the material will return to its original temperature while the electrical field is still present, thereby producing the electret. After the film or sheet 30 has been polarized in one direction, such material is rotated 90 degrees and positioned on the carriage assembly 20. A mask 34 having an image located thereon which may take the form of cut-out portions 36 (FIG. 2) is exposed to the radiant energy of the lamp 24, resulting in the area of the image that is exposed losing its original polarized condition due to raising of the temperature of the material and being repolarized in the direction indicated by the lines 38 by the application of the electrical field, which lines of polarization are orientated in a perpendicular direction to the lines 32 of the unexposed portions of the material 30. Thus, the exposed portions of the image 36 will be polarized in one direction while the remaining portion 39 of the material is polarized in a direction 90 degrees to the polarization of the exposed portion. The mask 34 may take the form of a photographic negative or other type of material which will either reflect or absorb the radiant energy.

Figure 3:
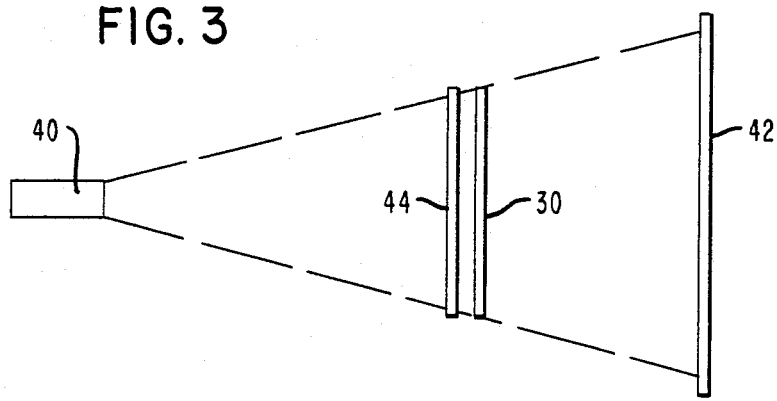
FIG. 3 is a schematic representation of the projection system for projecting images using the polarized film.
Figure 6:
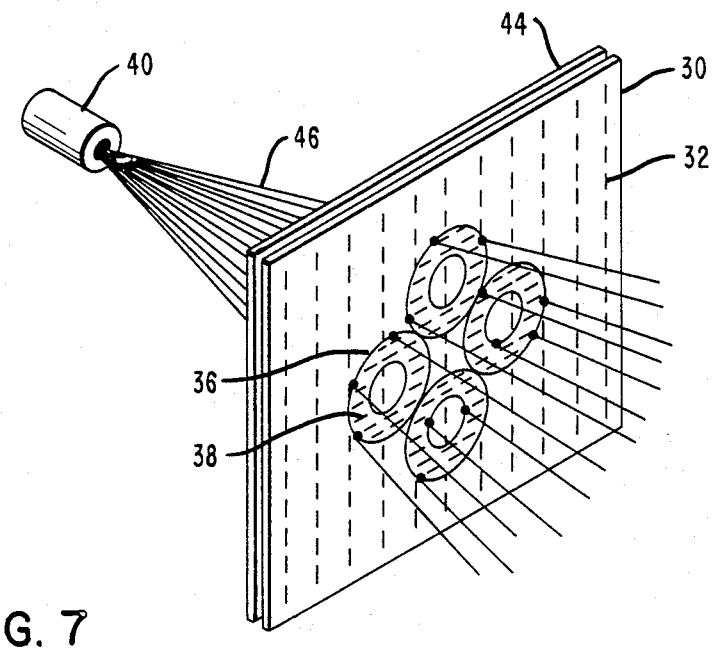
FIG. 6 is an oblique view of the polarized film when projecting a negative image.
Figure 7:
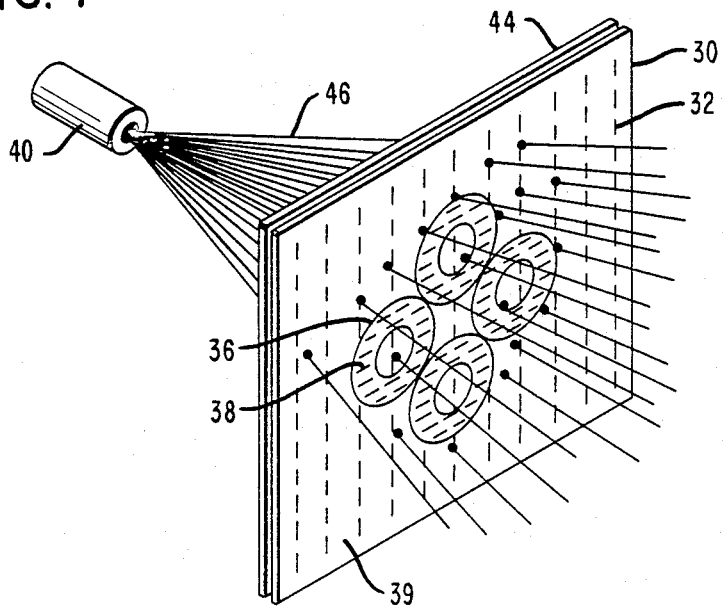
FIG. 7 is an oblique view of the polarized film when projecting a positive image.

Referring to FIG. 3, in projecting the image using the electret sheet or film 30 developed in the manner described above, the electret sheet 30 is positioned between a source of radiant energy 40 and a screen 42. Positioned adjacent the sheet 30 is a single plane polarized sheet 44 which polarizes the light beams emanating from the source 40 in a single plane. To project a negative image on the screen 42, the polarized sheet 44 is orientated to allow the light beams 46 (see also FIG. 6) projected from the source 40 to be polarized in a horizontal plane along the lines 38 when reaching the electret sheet 30. This arrangement results in the polarized light beams 46 traveling through the image 36 and not the remaining portion 39 of the electret sheet 30. To project a positive image on the screen 42, the polarized sheet 44 is rotated 90 degrees, resulting in the light beams 46 being polarized in a vertical direction along the lines 32 (FIG. 7) resulting in the light beams passing through the background area 39 of the image 36 while being blocked from passing through the image itself. It will thus be seen that a positive or negative image can be projected from the same electret sheet 30 by rotating the polarized sheet 90 degrees. Rotating the polarized sheet 44 between 0 degrees and 90 degrees will vary the contrast between a negative and positive image.

Figure 4:
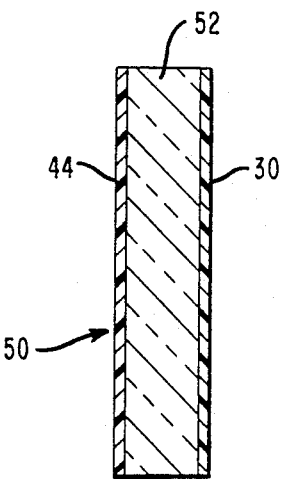
FIG. 4 is a cross-sectional view of a microfiche element constructed to project either a negative or positive photographic image in accordance with the present invention.

Referring now to FIG. 4, there is shown a cross-sectional view of a microfiche constructed in accordance with the present invention. The microfiche generally indicated by the numeral 50 comprises a substrate 52 composed of a transparent plastic material such as methylacrylate. Adhesively applied to one planar surface of the microfiche 50 is the electret sheet 30 containing an image such as the image 36 (FIG. 2) while on the opposite planar surface is mounted the polarized sheet 44 orientated to project the polarized light beams in either a horizontal or vertical plane, depending on whether a positive or negative image is to be projected. Insertion of the microfiche 50 in a microfiche reader (not shown) results in the projection of the image in a manner that is well-known in the art.

Figure 5:
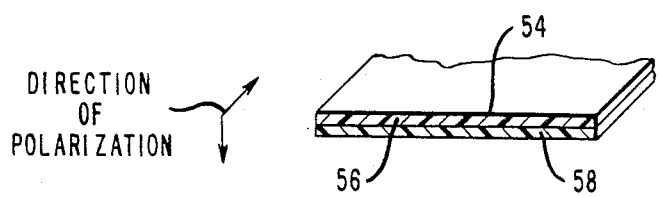
FIG. 5 is an oblique cross-sectional view of a photographic film constructed to project either a negative or positive photographic image in accordance with the present invention.

Referring now to FIG. 5, there is shown a cross-sectional view of a photographic film 54 in which the top portion 56 of the film is subject to the polarizing step of the image forming process described above, such that the portion 56 will act as a polarized sheet in either a horizontal or vertical plane depending on whether a positive or negative image is to be formed. As fully disclosed in the above referenced Anderson patent application, the depth of polarization of the dielectric is controllable through changes in the speed of the carriage or changes in the intensity of the heat or electrical energy or changes in any of the various dimensions. In the present example, the depth of polarization is caused to create the polarized portion 56 in the film material 54. The lower portion 58 of the film 54 is subjected to the process described above with respect to the forming of an image. Projecting light on the film produces a negative or positive image on the screen 42 (FIG. 3) depending on the angle of orientation of the polarized portion 56 of the film 54. For a complete description of the levels of temperature and power required to produce an electret in the film 54, reference should be made to the above Anderson patent application.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A method for displaying a plurality of photographic images comprising the steps of:
    heating a sheet of dielectric material to an electret forming temperature;
    applying an electrical potential to the heated dielectric material in a first direction along one surface of the material establishing a plane of polarization in the material corresponding to said first direction;
    rotating the material 90°;
    positioning an image-bearing mask on the dielectric material to form a first image on a first portion of the dielectric material and a second image on the remaining portion of the dielectric material;
    heating the first portion of the dielectric material to an electret-forming temperature;
    applying an electrical potential to the first portion of the heated dielectric material in a second direction which is at an angle to the plane of polarization of the remaining portion of the dielectric material establishing a plane of polarization along said one surface of the material in the first portion of the material corresponding to said second direction;
    and applying a polarized light having a plane of polarization which extends in a direction which corresponds to either of the planes of polarization of the first or remaining portion of the sheet of material for projecting either the first image or the second image onto a receiving surface.

2. The method of claim 1 in which the step of applying the polarized light further includes the steps of:
    positioning a polarized member adjacent the sheet of material having a plane of polarization corresponding to the plane of polarization of the first portion of the sheet of material;
    and locating the light source adjacent the polarized member for projecting light rays through said polarized member for producing the first image on a receiving surface.

3. The method of claim 1 in which the step of applying polarized light further includes the steps of:
    positioning a polarized member adjacent the sheet of material having a plane of polarization corresponding to the plane of polarization of the remaining portion of the sheet of material;
    and locating the light source adjacent the polarized member for projecting light rays through said polarized member for producing the second image on a receiving surface.

4. A method for displaying a plurality of photographic images recorded on a single photographic film comprising the steps of:

heating a sheet of dielectric material to an electret-forming temperature;

moving a pair of electrical conductors along one surface of the dielectric material in a first direction;

applying an electrical potential to the pair of electrical conductors enabling the electrical conductors to establish a plane of polarization in the material in the first direction of movement of the electrical conductors;

positioning an image-bearing mask adjacent said one surface of the dielectric material to form a first image on a first portion of the dielectric material and a second image on the remaining portion of the dielectric material;

heating the image portion of the dielectric material to an electret-forming temperature;

moving the pair of electrical conductors along the first portion of a dielectric material in a second direction which is an angle to the movement of the electrical conductor in said first direction;

applying an electrical potential to the pair of electrical conductors enabling the electrical conductors to establish a second plane of polarization in the image portion of the dielectric material extending in said second direction which is at an angle to the plane of polarization of the remaining portion of the dielectric material;

positioning a polarized member adjacent the sheet of dielectric material having a plane of polarization corresponding to the plane or polarization of the first portion of the sheet of material;

positioning a light source adjacent the polarized member for projecting light rays through said polarized member and the first portion of the dielectric material for displaying the first image of the dielectric material on a receiving surface;

rotating the polarized members to a position where the plane of polarization of the polarized member corresponds to the plane of polarization of the remaining portion of the sheet of material;

and positioning the light source adjacent the polarized member for projecting light rays through said polarized member and the remaining portion of the dielectric material for displaying the second image of the dielectric material on a receiving surface.

5. The method of claim 4 in which the dielectric material is rotated 90° after establishing a plane of polarization in the first direction.

* * * * *